UNITED STATES PATENT OFFICE.

SILAS C. LINBARGER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE AND METHOD OF MAKING THE SAME.

1,277,227.  Specification of Letters Patent.  Patented Aug. 27, 1918.

No Drawing.  Application filed March 22, 1918.  Serial No. 224,067.

*To all whom it may concern:*

Be it known that I, SILAS C. LINBARGER, a citizen of the United States, residing at Niagara Falls, Niagara county, New York, have invented a new and useful Improvement in Refractory Articles and Methods of Making the Same, of which the following is a full, clear, and exact description.

This invention has particular relation to refractory articles which contain graphite and silicon carbid. Graphite has long been used in the making of refractory articles, especially crucibles for the melting of metals. I have discovered that a mixture of graphite, silicon carbid and clay produce a crucible of very superior refractory qualities. Such a mixture is very easy to mold and work in the plastic state, and after burning has a body which compared to the graphite crucible is more refractory, less oxidizible, of superior strengh, and of high heat conductivity and great durability under abrasion and high temperature conditions.

As a typical mixture which may be employed for the production of articles embodying my invention, I take natural flake or Ceylon graphite—43 parts; silicon carbid No. 40 and finer—43 parts; and plastic fire clay—14 parts; these proportions being by weight. The graphite is preferably crushed material of a fineness such that it will pass through about a No. 16 mesh. The silicon carbid is run of the mill crystalline product, preferably containing no grit coarser than No. 40, and from this down to the finest powder, and should be substantially free from carbon and other impurities or foreign materials. The clay is a good refractory grade of plastic clay, properly weathered or aged by mechanical means and analyzing about as follows:

| | |
|---|---|
| Ign. loss | 11.00 |
| Silica | 56.00 |
| Alumina | 26.00 |
| Iron oxid | 5.00 |
| Alkalis | 1.50 |

I do not limit myself to this particular clay however, as many clays of varying compositions will act as satisfactory binders. Furthermore, I do not limit myself to any exact size in the crushing of the silicon carbid or the graphite, and I have found much finer grades of silicon carbid to give satisfactory results. Nor do I limit myself to any exact proportions. The clay may be varied to obtain more or less refractory compositions, or compositions which soften at different temperatures, depending on the metal to be melted or the use proposed. These materials are mixed with water and thoroughly worked in a pug mill until full plasticity of the mixture is developed. In the making of crucibles the well-known form of crucible jigger is employed in the molding operation, in which a plaster mold conforming to the outside dimensions of the crucible is revolved on the head of the jigger. A batch of the mixture is put in the mold and an inside forming tool is brought down within the mold and presses the material against the side of the mold at the same time spinning and working the material and forming it to shape against the walls of the mold as the mold revolves. The crucibles are then removed from the molds, dried and fired in kilns in the usual manner.

The graphite employed should be in flake or granular form, and for that reason, natural graphite is preferred.

In the manufacture of graphite crucibles the graphite particles or flakes have a tendency to aid in forming cleavages or parting planes in the walls of the crucible during the molding operation as the material is worked and spun under the forming tool. The weak spots in the structure may not appear until the crucible is fired or often until after it has been in use for some time. I find that the addition of the sharp crystalline silica carbid avoids this defect, that the mixture coheres much more strongly, and that there is no tendency for it to form slipping planes along which pieces of the crucible might spall off when put into use. On the contrary there is produced a very strong homogeneous structure.

The invention may be applied to many other refractory articles, such as muffles, retorts, bricks, tubes and the like.

The refractory articles produced by my process have many advantages over those produced from graphite and clay alone. The principal advantage is they will stand sudden changes of temperature very successfully without cracking or spalling. This is one very marked weakness of ordinary graphite crucibles. The heat conductivity of my composition is very high, which means great fuel economy and ease of melting. Silicon carbid is much less subject to oxidization than graphite and the resistance of the composition to oxidization therefore is relatively high. The tensile strength is greater than that of ordinary graphite articles and it also resists abrasion very successfully.

I claim:

1. In the art of molding refractory mixtures of graphite and clay, the improvement which consists in adding crystalline silicon carbid grain in quantities sufficient to lessen or prevent the formation of parting planes in the body of the molded mass.

2. The herein described refractory article, comprising graphite to a percentage above fifteen per cent. by weight, silicon carbid, and a bonding material.

3. The herein described refractory article, containing graphite in flake or granular form, silicon carbid, and clay.

4. The herein described refractory article, containing graphite to a percentage above fifteen per cent. by weight, silicon carbid, and clay.

In testimony whereof, I have hereunto set my hand.

SILAS C. LINBARGER.